United States Patent [19]

Liu

[11] Patent Number: 4,717,828
[45] Date of Patent: Jan. 5, 1988

[54] LASER COMMUNICATION SYSTEM

[75] Inventor: Chi-Sheng Liu, Monroeville Boro, Pa.

[73] Assignee: Westinghouse Electric Corp., Pittsburgh, Pa.

[21] Appl. No.: 780,341

[22] Filed: Sep. 26, 1985

[51] Int. Cl.⁴ ............................................. F21V 9/16
[52] U.S. Cl. ................................. 250/458.1; 356/318
[58] Field of Search ............... 250/458.1, 461.1, 336.1; 307/425; 356/311, 318

[56] References Cited

U.S. PATENT DOCUMENTS

3,795,819  3/1974  Harris ................................. 307/425
3,801,797  4/1974  Harris et al. ........................ 307/425
4,292,526  9/1981  Marling ............................ 250/458.1

Primary Examiner—Janice A. Howell
Attorney, Agent, or Firm—W. G. Sutcliff

[57] ABSTRACT

A laser communication system in which a filter-detector is provided which has a high acceptance angle and a narrow bandwidth. The filter-detector contains vaporized selected atomic species or a molecular composition dissociable to the selected atomic species. The selected atomic species electronic ground state is not absorptive of the laser output wavelength, but the selected atomic species exhibits a metastable or long-lived energy state which when populated absorbs the laser output wavelength. A subsequent transition produces fluorescence from the atomic species as a function of the laser output.

9 Claims, 9 Drawing Figures

LASER COMMUNICATION SYSTEM

GOVERNMENT CONTRACT

The U.S. Government has rights in this invention pursuant to Contract No. N00014-83-C-0416 awarded by the Department of the Navy.

BACKGROUND OF THE INVENTION

The present invention is directed to a laser communication system, and more particularly to providing a filter-detector receiver for such a system which permits use of a wide variety of laser operating wavelengths.

In proposed laser communication systems which employ a laser transmitter, the receiver is typically an interference filter means which permits only the carrier wavelength to reach the detector. Such interference filters, which are typically optical coatings or plural optical layers of different refractive index, can only accept an input beam incident at a small angle from the normal with a narrow bandwidth, which limits their practical use in optical communication systems. Various laser communication systems for military and civilian applications have been proposed in which the laser beam is transmitted through space, the atmosphere, or through water. For such systems to be practical a filter-detector receiver is desired which is highly efficient at a narrow bandwidth, and which filter exhibits a large field of view or acceptance angle.

Recently, it has been suggested that a filter-detector receiver be fabricated using an atomic resonance filter. In such a filter, cesium vapor which has absorption lines at 459.3 and 455.5 nanometers is utilized as the filter for a Raman downshifted xenon chloride laser transmitter. The cesium atoms in the ground state absorb the laser output line, and upon relaxation, emit characteristic detectable 894 nanometer, and 853 nanometer output fluorescence or radiation. This cesium filter is one of a very few atomic species with an absorption line that closely matches a practical laser output wavelength.

Recent laser developments have greatly increased the variety of lasers and operating wavelengths by use of tunable molecular lasers, dye laser, and Raman lasers. A receiver which permits use of the wide variety of operating laser wavelengths is sought.

SUMMARY OF THE INVENTION

A laser communication system has been provided in which a laser transmitter has a predetermined operating output wavelength which is modulated with a communication signal. A filter-detector receiver is operative to selectively detect the laser output wavelength. The filterdetector receiver comprises a hermetically sealed chamber with a large acceptance angle radiation input portion. The chamber contains a predetermined amount of vapor of selected atomic species or selected molecular species which is dissociable to the selected atomic species, which selected atomic species has an electronic ground state which does not absorb the laser output wavelength, but which species has a metastable or a long-lived excited state, which when populated efficiently absorbs the laser output wavelength, and undergoes transition to an excited state, from which radiative transition to a lower energy state occurs, with the output fluorescence or radiation produced by this transition being detectable as a function of the absorption of the laser output. The filter includes means for populating the metastable energy state or long-lived excited state of the selected atomic species, and detector means coupled to the chamber radiation output portion for collecting the fluorescence from the selected atomic species to provide high selectivity to the receiver system.

A variety of selected atomic species are suggested including thallium, barium, strontium, bismuth and copper, which species may also be present as selected halides.

The means for populating the selected atomic species metastable state or long-lived excited state can be an optical pumping source which has an output wavelength which is efficiently absorbed by the atomic species. When the selected atomic species is present as a molecular vapor, the optical pumping source provides an output wavelength which is efficiently absorbed by the molecular vapor which then undergoes dissociative excitation to populate the selected atomic species metastable or long-lived energy state. The selected atomic species provided in the filter-detector chamber can have its metastable or long-lived energy state populated by inclusion of a second selected atomic species within the chamber, which second selected atomic species has an excited energy state which is optically pumped and is closely spaced from the metastable or long-lived energy state of the selected atomic species. The metastable or long-lived energy state of the selected atomic species is then populated by a collision transfer process from the second selected atomic species.

The term "long-lived energy state" means that there is not an immediate radiative transition from such energy state to a lower energy state in the normal immediate or nanosecond time frame, but rather the transition is delayed or long lived with the transition occurring after a period of the order or microseconds or longer.

In this way a receiver can be provided which has a wide variety of operating wavelengths to match a variety of practical laser operating wavelengths.

DESCRIPTION OF THE PREFERRED EMBODIMENTS

Figure 1:
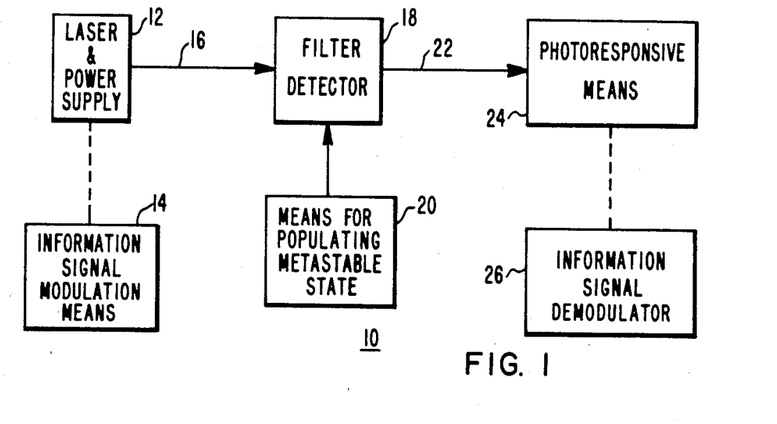
FIG. 1 is a schematic representation of the laser communication system of the present invention.

The invention can be best understood by reference to the embodiment schematically shown in FIG. 1, wherein the laser communication system 10 includes a laser and power supply 12. A communication or information signal modulation means 14 is electrically coupled to the laser and power supply 1 to modulate the laser output beam 16. The laser output beam 16 is of a characteristic coherent wavelength which is optically coupled to the filter-detector receiver 18. Coupled to the receiver 18 is means 20 for populating the metastable or long-lived electronic energy state of the selected atomic species present in the filter-detector as will be explained below in detail. An output beam 22 is directed from the receiver 18 as a function of the input laser beam 16, and is optically coupled to photo-responsive means 24. Information signal demodulator 26 is coupled to the photo-responsive means 24.

Figure 2:
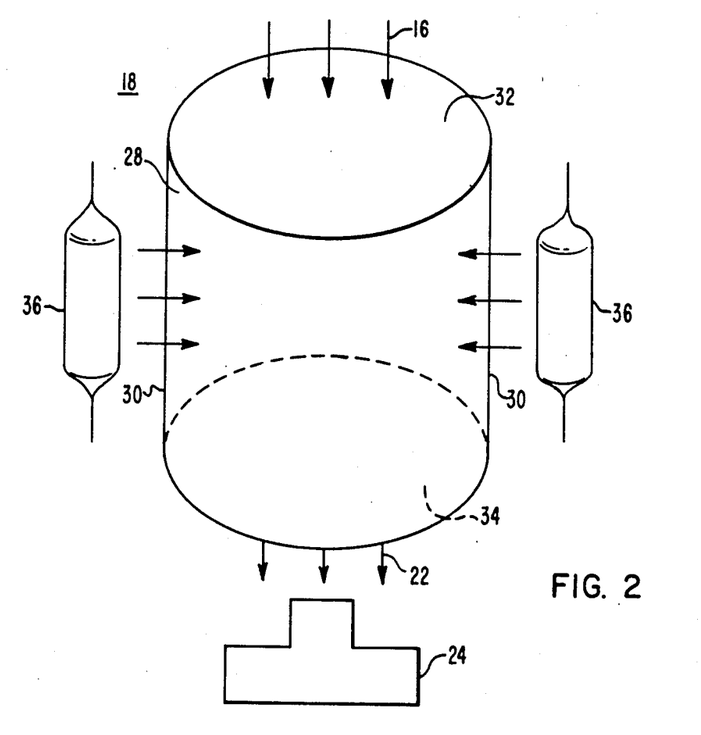
FIG. 2 is a schematic representation of the filter-detector receiver and photo-detector portions of the system seen in FIG. 1.

The filter-detector receiver 18 is shown schematically in FIG. 2, and includes a hermetically sealed chamber 28, which is here shown as being cylindrical with a radiation transmissive cylinder wall 30. The laser beam input end face 32 is highly transmissive to the laser beam wavelength, and is made to selectively filter other wavelengths. The output end face 34 is selectively transmissive to fluorescence emitted by the selected atomic species which is present as an atomic or selected molecular vapor in the chamber 28. The receiver output beam 22 is directed onto the photo-responsive means 24 which can be a photomultiplier responsive to wavelength of the output beam 22. Optical pumping means 36, such as discharge lamps, are optically coupled to the chamber 28 through the wall 30 to permit population of the metastable or long-lived energy state of the selected atomic species within the chamber. Typically, a heating means, not shown, is associated with the chamber 28 to insure sufficient vapor pressure for the atomic species.

Figure 3:
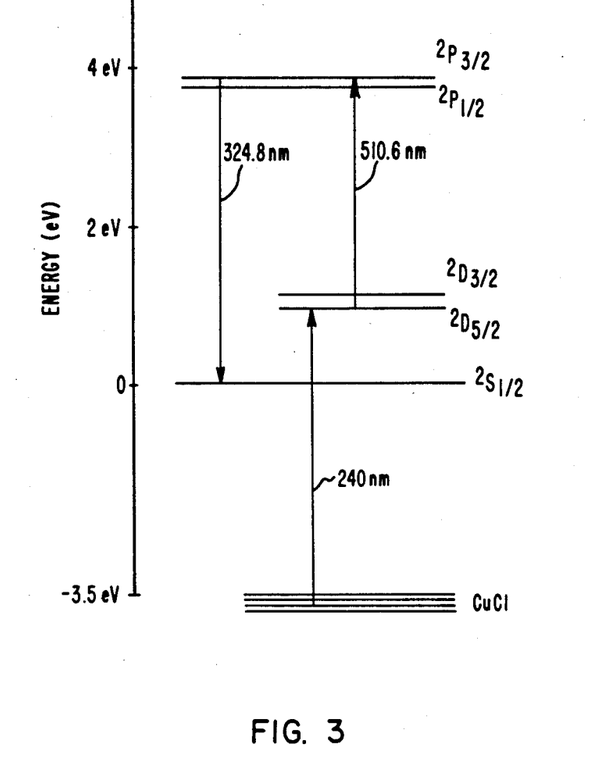
FIG. 3 is an energy level diagram of copper and copper chloride which illustrates the operation of a filter-detector embodiment with energy expressed in electron volts.

By way of specific embodiment, for a system using a copper vapor laser which is a high power, high repetition rate laser radiating at both 510.6 nm. and 578.2 nm. simultaneously, the chamber 28 contains copper chloride or copper bromide which is heated to provide a copper halide vapor. Optical pumping means 36 such as ultraviolet flash lamps are disposed about the chamber side wall 30 to permit dissociative excitation of the copper halide from the molecular ground state to a metastable electronic energy state of the atomic copper. This ultraviolet pumping to populate the metastable state is illustrated in FIG. 3. This energy level diagram illustrates that the ground state for copper chloride molecules is not absorptive of the 510.6 nm. laser beam. It also shows that 240 nm. ultraviolet input energy pumps copper atoms to the $^2D_{5/2}$ metastable state by dissociative excitation, and that with sufficient population of this metastable energy state, the 510.6 nm. laser beam will be absorbed, and results in fluorescence of 324.8 nm. output when the $^2P_{3/2}$ energy electron undergoes radiative transition to the lower energy level ground state. This 324.8 nm. output can be detected by the photo-multiplier as a function of the laser input beam. The 578.2 nm. component of the copper laser beam is absorbed by the copper vapor in the filter-detector and populates the $^2P_{1/2}$ metastable energy level which undergoes radiative decay emitting 327.4 nm. emission which can also be detected as a function of laser input.

The copper vapor filter-detector exhibits a narrow bandwidth of less than 0.01 nm., and a large acceptance angle or filed of view of about 180 degrees. This filter-detector can be easily optically pumped with a broad band source near 240 nm., can be operated at relatively low temperature, and has a fast response time. The broad band pumping results in a high density and volume of metastable copper atoms. The use of dissociable copper halide permits operation at about 300° C. in the chamber.

Figure 4:
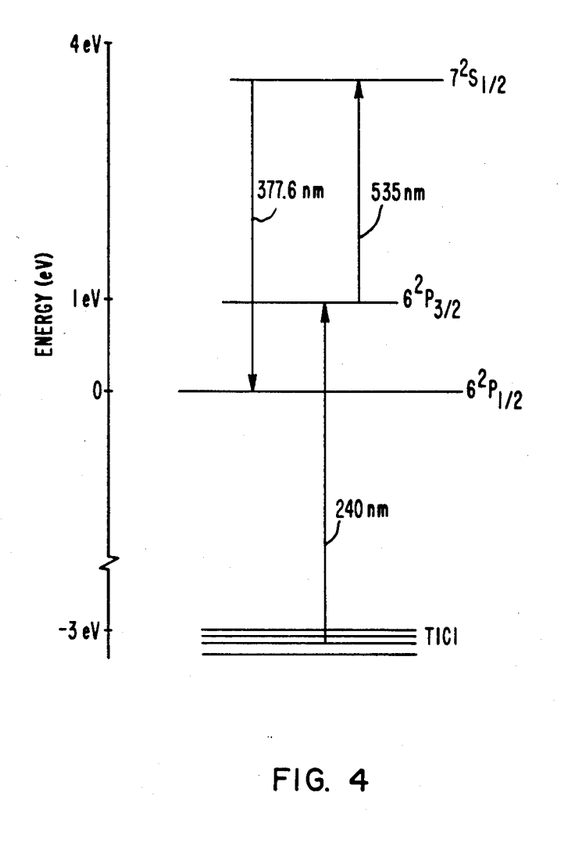
FIG. 4 is an energy level diagram of thallium chloride and thallium in another embodiment.

There have been recent proposals to build laser systems operating in the blue-green portion of the spectrum which take advantage of the efficient bandpass characteristic of water as the transmission medium at such wavelengths. A frequency doubled neodymium laser or a dye laser transmitter can provide an output beam at 535 nm. and has been suggested for such a system. An efficient filter-detector for such a system can be had utilizing the filter-detector structure shown in FIG. 2, with a predetermined amount of thallium chloride or thallium bromide vapor provided within the chamber. The chamber is heated to about 400° C. to vaporize the thallium chloride or bromide, and an ultraviolet flash lamp used to optically pump the thallium chloride as shown in FIG. 4. The metastable thallium $6^2P_{3/2}$ state is populated by optical pumping of the TlCl vapor at about 240 nm. by a mercury discharge lamp. Then 535 nm. laser input energy can be detected by monitoring the thallium fluorescence at 377.6 nm.

This thallium line filter-detector is thus a good match for 535 nm. laser output with the detector having less than 0.1 Angstrom bandwidth and near 180 degree acceptance angle. The neodymium laser can operate at 1.07 nm., but with frequency doubling provides the 535 nm. laser output.

Figure 5:
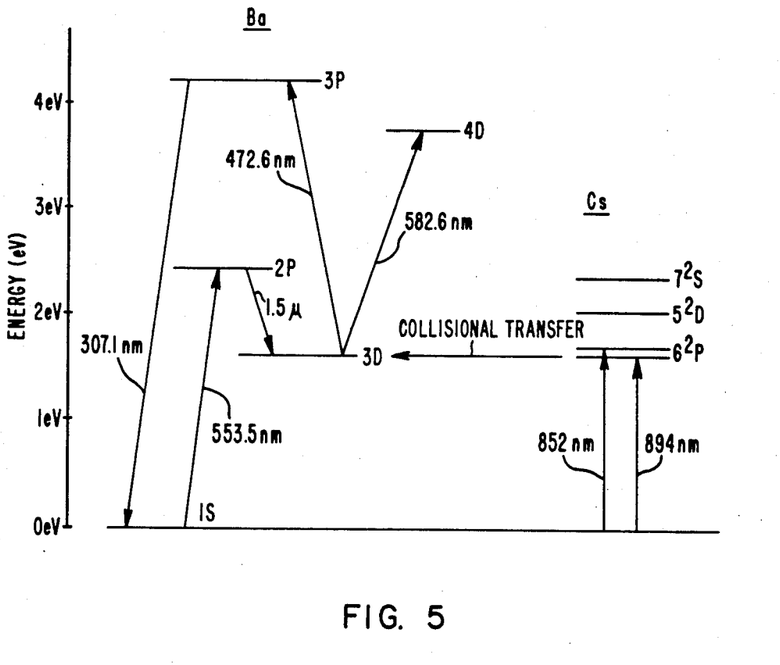
FIG. 5 is an energy level diagram of barium and cesium which illustrates yet another embodiment.
Figure 6:
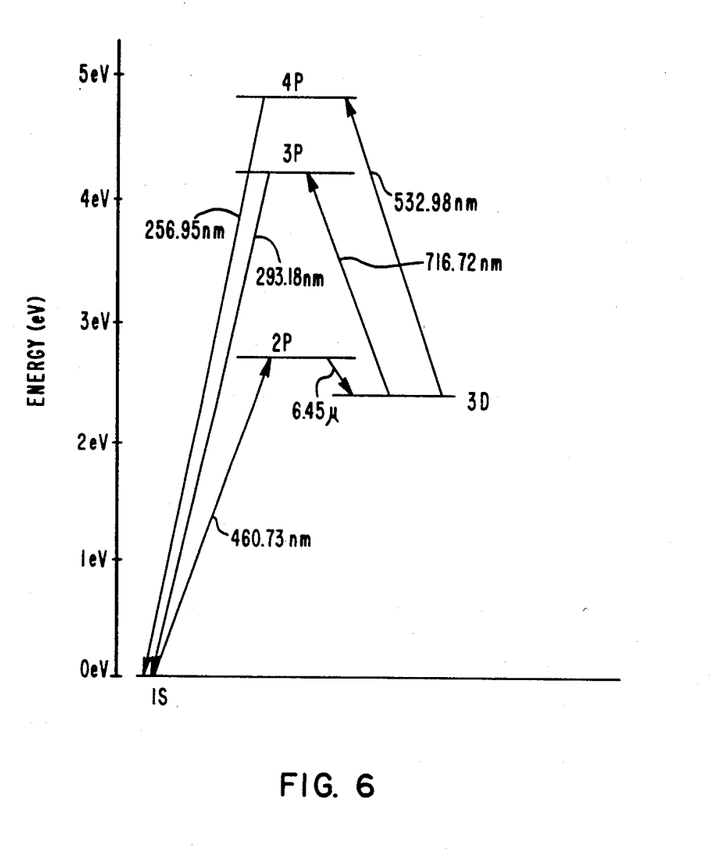
FIG. 6 is an energy level diagram of strontium in still another embodiment.

Other embodiments of the present invention also designed for use in the blue-green portion of the spectra are illustrated by FIGS. 5 and 6. In FIG. 5, an energy level diagram illustrates how barium pumped to populate the barium $^1D_2$ metastable state, which when populated absorbs 472.6 nm. laser input, and results in subsequent fluorescent radiance of 307.1 nm. output, which can be readily detected with an ultraviolet responsive photo-detector. The metastable barium state can be populated by optical pumping with 553.5 nm. energy from a barium resonance lamp.

FIG. 5 also illustrates another way of populating the metastable barium level. A mixture of barium and cesium vapor is provided in the filter-detector chamber. The cesium vapor is pumped to its 6 p. energy levels by a cesium resonance source. These cesium energy levels are closely spaced from the barium metastable level and by a collision transfer mechanism the barium metastable level can be populated. Again the laser wavelength of 472.6 nm. is absorbed by the populated barium metastable energy level and results in fluorescence at 307.1 nm. following the illustrated transitions.

In FIG. 6, a strontium iodide energy level diagram illustrates how this can be used as a green filter-detector for 532.9 nm. laser output. As with the barium embodiments, a strontium resonance lamp is used to optically pump the strontium in the filter-detector to the 3D metastable energy level which is absorptive of the 532.9 nm. laser beam, to produce 256.95 nm. output. The metastable level also absorbs 716.72 nm. input and results in 293.18 nm. emission following transition.

Figure 7:
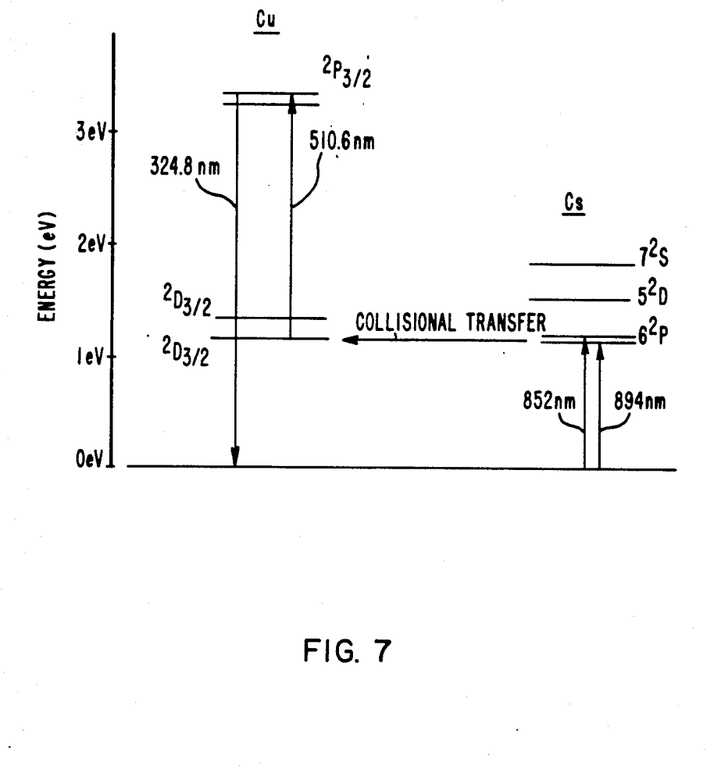
FIG. 7 is an energy level diagram of copper and cesium in yet another embodiment.

In yet another embodiment of the present invention illustrated by FIG. 7, the filter-detector contains a mixture of copper vapor and cesium vapor. The cesium vapor is absorptive of 852 nm. and 894 nm. pumping energy and populates the copper metastable state $^2D_{5/2}$ by collisional transfer. The populated copper metastable state is then absorptive of 510.6 nm. laser output, and radiates at 324.8 nm. For such collisional transfer to take place, the energy levels of the optically pumped species, i.e. the cesium, must be closely spaced from the metastable state of the species which is absorptive of the laser signal, i.e. the copper.

Figure 8:
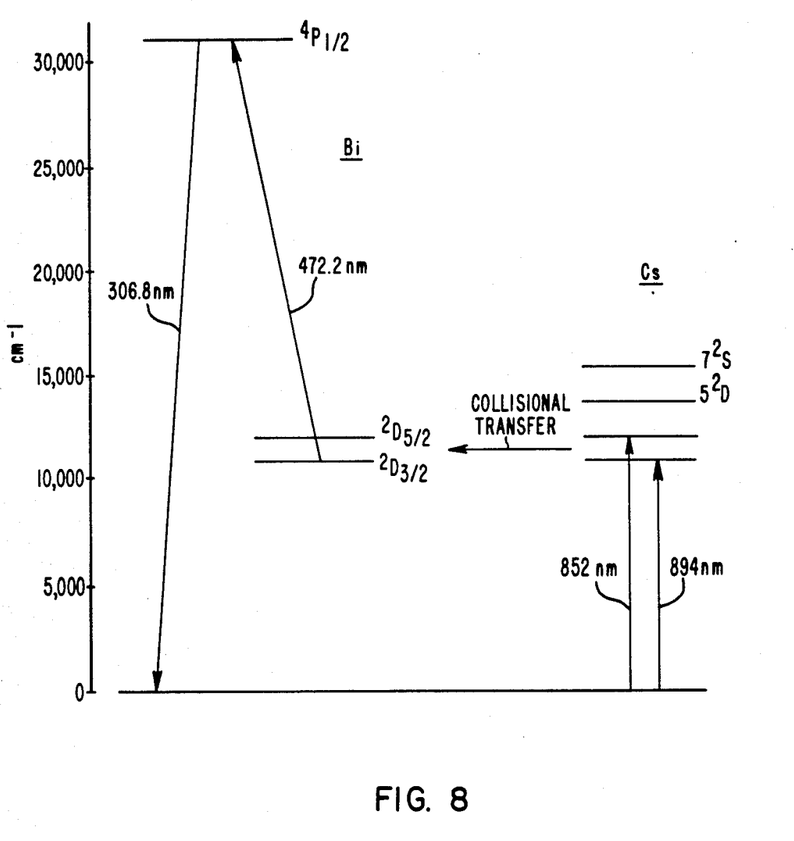
FIG. 8 is an energy level diagram for bismuth and cesium which illustrate another embodiment of the invention with the energy expressed as wave number.

FIG. 8 illustrates another embodiment, in which the filter-detector chamber contains a mixture of bismuth and cesium vapor. The cesium vapor is excited by a cesium resonance source of 852 and 894 nm. input. The excited cesium energy level is closely matched or spaced from the bismuth metastable or long-lived energy level and the bismuth level is populated by a collision transfer mechanism. The populated bismuth level absorbs 472.2 nm. laser input and produces 306.8 nm. output fluorescence which can be detected as a function of the laser transmitter input.

Figure 9:
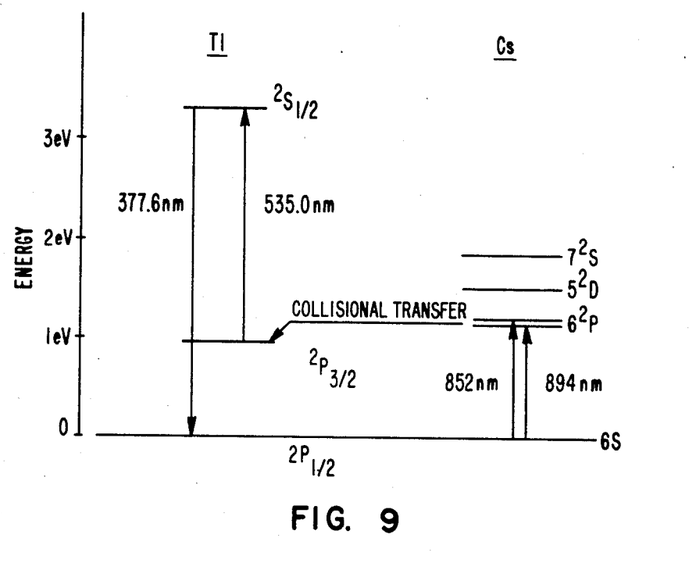
FIG. 9 is a partial energy level diagram for thallium and cesium which illustrates yet another embodiment, with energy plotted in electron-volts.

In another embodiment of the present invention the laser transmitter is a Nd:La$_2$Be$_2$O$_5$ laser which has a frequency doubled output line at 535 micrometers, and the filter-detector chamber contains a mixture of thallium and cesium vapor. The energy level diagram of FIG. 9 illustrates how the cesium vapor in the filter-detector chamber can be exerted by a cesium resonance source which provides 852 and 894 micrometer output. The excited cesium energy level is closely matched or spaced from the thallium state $^2P_{3/2}$, which thallium state is excited by a collisional transfer from the excited cesium state. The populated thallium state absorbs the 535 micrometer output had from the Nd:La$_2$Be$_2$O$_5$ laser, and a resultant output line at 377.6 micrometers is produced, which output line can be detected as a function of the laser transmitter input.

I claim:

1. A laser communication system in which a laser transmitter having a predetermined output wavelength is modulated with a communication signal, and wherein a filter-detector receiver is operative to selectively detect the laser output wavelength, wherein the filter-detector receiver comprises:

(a) a hermetically sealed chamber with a high acceptance angle input portion, which chamber contains a predetermined amount of vapor of selected atomic species or selected molecular composition which is dissociable to the selected atomic species wherein the selected atomic species is one of the group of thallium, barium strontium, bismuth, and copper; and which selected species ground state does not absorb the laser output wavelength, and which selected atomic species exhibits a metastable or long-lived energy state which when populated efficiently absorbs the laser output wavelength and undergoes a transition to an excited state form which radiative transition to a lower energy state occurs which fluorescence is detectable as a function of absorption of the laser output;

(b) means for populating the metastable energy state or long-lived energy state of the selected atomic species; and (c) detector means coupled to the chamber for collecting the radiation output from the selected atomic or molecular species.

2. The system set forth in claim 1, wherein the selected molecular species is one of the group of thallium chloride, thallium bromide, copper chloride, and copper bromide.

3. The system set forth in claim 1, wherein the molecular species is a selected halide of thallium, barium, strontium, bismuth, or copper.

4. The system set forth in claim 1, wherein the means for populating the metastable energy state of the selected atomic species is an optical source having output radiation of a wavelength which is efficiently absorbed by the atomic species to populate the metastable energy state.

5. The system set forth in claim 1, wherein the means for populating the metastable energy state of the selected atomic species includes a second selected atomic species included as a vapor in the hermetically sealed chamber, which second selected atomic species has an excited state of an energy level which is sufficiently close to the metastable energy state of the selected atomic species when such metastable energy state is populated by collision transfer from the second selected atomic species.

6. The system set forth in claim 5, wherein the selected atomic species is thallium, barium, copper, or bismuth, and the second selected atomic species is cesium.

7. The system set forth in claim 5, wherein the laser transmitter is a Nd:La$_2$Be$_2$O$_5$ laser, and the filter detector receiver includes thallium as the selected atomic species, and the second selected atom species is cesium.

8. A filter detector for a predetermined laser wavelength comprising a hermetically sealed chamber containing a predetermined amount of vapor of selected atomic species or selected molecular composition which is dissociable to the selected atomic species, wherein the selected atomic species is one of the group of thallium, barium, strontium, bismuth, and copper, wherein the selected atomic species does not absorb the laser output wavelength, and which selected atomic species exhibits a metastable or long-lived energy state which when populated efficiently absorbs the laser output wavelength and undergoes a transition to an excited state from which radiative transition to a lower energy state occurs with emission of fluorescence which is detectable as a function of absorption of the laser output.

9. The filter detector set forth in claim 7, wherein a second selected atomic species is included in the chamber and this species is cesium.

* * * * *